United States Patent
Kiss et al.

(10) Patent No.: US 9,190,055 B1
(45) Date of Patent: Nov. 17, 2015

(54) NAMED ENTITY RECOGNITION WITH PERSONALIZED MODELS

(71) Applicant: Amazon Technologies, Inc., Reno, NV (US)

(72) Inventors: Imre Attila Kiss, Arlington, MA (US); Lambert Mathias, Arlington, MA (US); Jeffrey Penrod Adams, Tyngsborough, MA (US)

(73) Assignee: Amazon Technologies, Inc., Seattle, WA (US)

( * ) Notice: Subject to any disclaimer, the term of this patent is extended or adjusted under 35 U.S.C. 154(b) by 226 days.

(21) Appl. No.: 13/828,759

(22) Filed: Mar. 14, 2013

(51) Int. Cl.
*G10L 15/18* (2013.01)
*G10L 15/06* (2013.01)
*G10L 15/26* (2006.01)

(52) U.S. Cl.
CPC ........... *G10L 15/18* (2013.01); *G10L 15/063* (2013.01); *G10L 15/26* (2013.01); *G10L 15/265* (2013.01)

(58) Field of Classification Search
CPC .......... G06F 17/30976; G06F 17/2818; G06F 17/30867; H04L 12/5805; H04L 51/03; H04L 51/32; G10L 15/063; G10L 2015/0638; G10L 15/26; G10L 13/043; G10L 15/06; G10L 15/22; G10L 15/265; G06Q 30/02
USPC ............. 704/9, 10, 257, 7, 251; 707/999.005, 707/673, 999.006, 999.003; 726/26; 715/748
See application file for complete search history.

(56) References Cited

U.S. PATENT DOCUMENTS

| | | | | |
|---|---|---|---|---|
| 5,574,784 | A * | 11/1996 | LaPadula et al. | 379/265.02 |
| 6,029,132 | A * | 2/2000 | Kuhn et al. | 704/260 |
| 6,148,285 | A * | 11/2000 | Busardo | 704/260 |
| 6,233,553 | B1 * | 5/2001 | Contolini et al. | 704/220 |
| 6,738,745 | B1 * | 5/2004 | Navratil et al. | 704/277 |
| 6,882,970 | B1 * | 4/2005 | Garner et al. | 704/236 |
| 7,092,888 | B1 * | 8/2006 | McCarthy et al. | 704/277 |
| 7,941,317 | B1 * | 5/2011 | Goffin et al. | 704/256.7 |
| 2002/0101537 | A1 * | 8/2002 | Basson et al. | 348/465 |
| 2002/0194005 | A1 * | 12/2002 | Lahr | 704/271 |
| 2003/0191643 | A1 * | 10/2003 | Belenger et al. | 704/254 |
| 2004/0024582 | A1 * | 2/2004 | Shepard et al. | 704/2 |
| 2007/0198269 | A1 * | 8/2007 | Braho et al. | 704/270 |

\* cited by examiner

*Primary Examiner* — Vijay B Chawan
(74) *Attorney, Agent, or Firm* — Knobbe, Martens, Olson & Bear, LLP

(57) ABSTRACT

Features are disclosed for generating and using personalized named entity recognition models. A personalized model can be trained for a particular user, and then interpolated with a general model for use in named entity recognition. In some embodiments, a model may be trained for a group of users, where the users share some similarity relevant to language processing. In some embodiments, various base models may be trained so as to provide better accuracy for certain types of language input than a general model. Users may be associated with any number of base models, and the associated based models may then be interpolated for use in named entity recognition on input from the corresponding user.

25 Claims, 10 Drawing Sheets

NAMED ENTITY RECOGNITION WITH PERSONALIZED MODELS

BACKGROUND

Natural language processing systems include various modules and components for receiving textual input from a user and determining what the user meant. In some implementations, a natural language processing system includes an automatic speech recognition ("ASR") module that receives audio input of a user utterance and generates one or more likely transcriptions of the utterance. Natural language processing systems may also include a natural language understanding ("NLU") module that receives textual input, such as a transcription of a user utterance, and determines the meaning of the text in a way that can be acted upon, such as by a computer application. For example, a user of a mobile phone may issue a spoken command to initiate a phone call. Audio of the spoken command can be transcribed by the ASR module, and the NLU module can determine the user's intent (e.g., that the user wants to initiate the phone call feature) from the transcription and generate a command to initiate the phone call.

An NLU module can identify particular words (e.g., named entities) in the transcription that are of particular importance in determining the user's intent. Based on those named entities, the NLU module can identify the user's intent and generate an output that may be used by an application to respond or otherwise perform an action regarding the user's intent. In a typical implementation, named entity recognition involves processing input to generate data about each word of the input, and then comparing that data to elements in a named entity recognition model to determine which element is the best fit for the input data.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
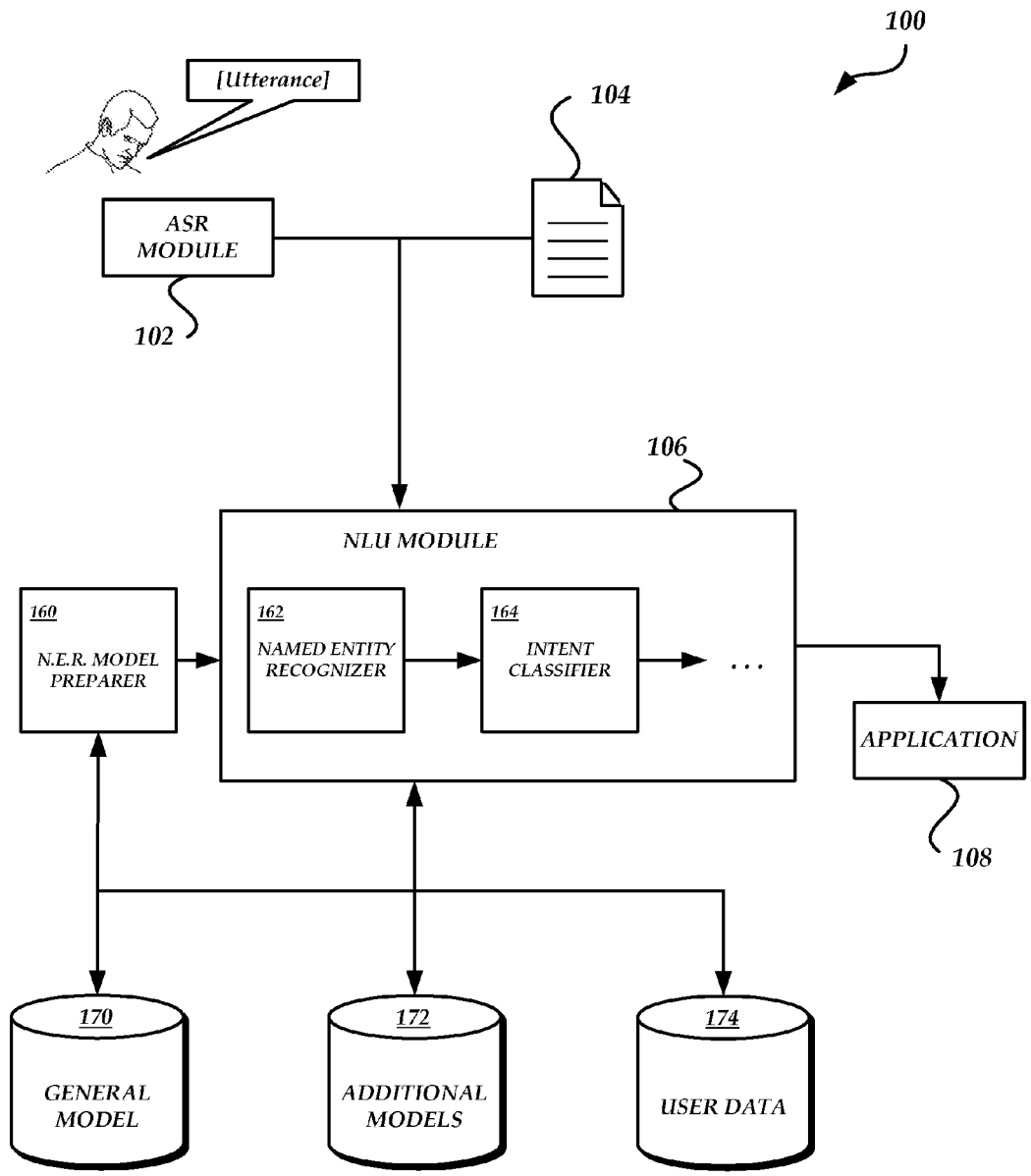
FIG. 1 is a block diagram of an illustrative natural language processing system that includes a named entity recognition model preparer to select or generate a named entity recognition model for a particular user.

Natural language processing ("NLP") systems can receive textual input and determine the likely meaning of the input. Many NLP systems assign labels to some or all words of the textual input to aid in processing. These labeled words, referred to as named entities, can be used to help determine what the textual input means. For example, an input sentence such as "Play Chicago by Frank Sinatra" has five words. The NLP system can use named entity recognition models to determine the most likely label for some or all of the words (e.g., "Play" may be labeled as a trigger or action, "Chicago" may be labeled as a song title, etc.). The named entity recognition model that the NLP system uses may be trained on a large amount of data so that it is able to accurately identify and label input words related to a wide range of topics and/or input words from a wide range of users.

In many cases, training a named entity recognition model on such a large amount of data can take a considerable amount of time and computing resources. Furthermore, such general named entity recognition models may not provide accurate results in particular circumstances or for particular users (e.g., some input may include words or phrases not typically used by the general population, or used differently than by the general population). A customized named entity recognition model may provide better accuracy in such cases. However, it may not be practical to generate such customized named entity recognition models due to the amount of data and computing resources that would be required to produce a model covering enough potential inputs to be useful.

Aspects of this disclosure relate to generating and using customized, personalized, or otherwise modified models for named entity recognition. In some embodiments, the named entity recognition models, also referred to herein simply as models, may be conditional random field ("CRF") models, maximum entropy Markov models ("MEMMs"), or other exponential models. The personalized models described herein can provide additional accuracy for individuals or groups of users without sacrificing the breadth of coverage provided by general models. User data (e.g., contacts, calendar entries, music, and movies on a user device or in a network-based user storage area) and prior usage history may be used to generate a personal model for a particular user. The personal model may be more accurate than a general model when processing input from the user that includes words or phrases in the user data or prior usage history upon which the personal model is based. Because such personal models are based on a comparatively smaller quantity of data, they may be generated in less time, using fewer computing resources than general models. To leverage the breath provided by general models, the personal model may be interpolated with a general model, thereby producing a single customized model (or a logical association of models) that provides both general coverage and user-specific accuracy. For example, data from elements (e.g., parameter vectors) of the personal model can be combined with data from corresponding elements of the general model to provide a comprehensive model that better covers both general and specific input text.

Additional aspects of the present disclosure relate to generating personalized models for groups of users. User data, characteristics, and prior usage data may be collected and processed for a large number of users (e.g., thousands or millions of users). Statistical analyses and pattern recognition techniques may be applied to the collected data to identify clusters of users that share similar interests, vocabularies, or usage characteristics (e.g., speak in a similar fashion, use similar terminology, etc.). The data from a particular user group or cluster can form the basis of a model tailored for that group. As a result, a predetermined or dynamically determined number of group-specific models may be generated and used. The data from a particular group may be supplemented with general model training data to ensure that the resulting group model accurately covers both general and group-specific input. While models produced using this technique may not provide the same level of single-user-specific accuracy as the interpolated personal/general models described above, the models produced using this technique can be used without any run-time interpolation or other specialized processing after the models have been generated. In some embodiments, group models may be combined with a general model to provide additional coverage.

Further aspects of the present disclosure relate to generating and using a set of base models that are optimized for particular input types or user types. Any specific user may be associated with multiple base models. The particular base models that a user is associated with can be determined based on user data, user characteristics, prior usage history, and the like. In addition, the base models with which a user is associated may change over time as usage history accumulates, user data changes, etc. When an NLP system is processing input from a particular user, it can determine which base models the user is associated with, and interpolate those models to form a personal model for the user.

Although aspects of the embodiments described in the disclosure will focus, for the purpose of illustration, on a natural language processing system that receives spoken input in the form of user utterances and determines a user intent from that input, one skilled in the art will appreciate that the techniques disclosed herein may be applied to any number of software processes or applications performing named entity recognition. For example, a textual content item may be submitted by a user. As another example, the natural language processing system may be used to analyze publications and other network-accessible printed content, etc. Various aspects of the disclosure will now be described with regard to certain examples and embodiments, which are intended to illustrate but not limit the disclosure.

Example NLP System

With reference to an illustrative example, a user may issue spoken commands or otherwise make spoken utterances to a client device, such as a mobile phone or tablet computer. The utterances may be transmitted to a network-accessible NLP system, which processes the utterance to determine both the content of the utterance, and the meaning of the utterance. The NLP system, or some other component or system associated therewith, can then take some action based on the meaning of the utterance. Alternatively, the NLP system may obtain textual input, either from a user or via some automated process. In a manner similar to the processing of the utterance, the NLP system can determine the meaning of the textual input, take some action based upon that meaning, etc. FIG. 1 illustrates such a natural language processing system 100.

When an utterance is received by the NLP system 100, an automatic speech recognition ("ASR") module 102 can process the utterance (e.g., analyze the audio data received from a user device) to generate one or more likely transcripts for the utterance. The transcripts (or some other textual input 104) may then be provided to a natural language understanding ("NLU") module 106 to process the text and derive a user intent or meaning.

A named entity recognition model preparer 160 (referred to herein simply as a model preparer) may prepare named entity recognition models for use by the NLU module 106. The model preparer 160 can generate, select, or otherwise prepare the named entity recognition model that will be used to process the current input. For example, the model preparer 160 can interpolate a user-specific model and a general model. The model preparer 160 can obtain a general model from a general model data store 170 and a user-specific model associated with the current user from an additional models data store 172. The model preparer can then interpolate or otherwise combine the models to generate the model that will be used to process the current input, and provide that model to the named entity recognizer 162. As another example, the model preparer 160 can identify the group with which the current user is associated, and retrieve a group-specific model from the additional models data store 172 or some other data store. As a further example, the model preparer 160 can identify one or more base models associated with the current user, and retrieve those base models from the additional models data store 160. The model preparer 160 can then interpolate the base models to generate the model that will be used to process the current input. As a default, if a user is not associated with any personal, group-specific, or base models, the model preparer can provide a general model from the general model data store 170 to the named entity recognizer 162. The model preparer 160 may prepare the models offline (e.g., not in response to receipt of an utterance but rather some time beforehand) or inline (e.g., in response to receipt of an utterance).

The NLU module 106 may include various modules, components, and the like for performing individual processes. In some embodiments, the NLU module 106 may include a named entity recognizer 162, an intent classifier 164, and any number of other components.

The named entity recognizer 162 can receive the input text and tokenize it into a sequence of words. Each word may then be processed against the named entity recognition model provided by the model preparer 160 to determine which named entity label most likely applies to the word. Multiple named entity labels may be determined for a single word, and a score or likelihood may be associated with each named entity indicating the likelihood that the particular named entity is the best result for word. The named entity recognizer 162 can then choose the best sequence(s) of named entities for the entire input sequence of words based on those scores. The best sequence of named entities, or an N-best list of sequences, can be provided to the intent classifier 164, which determines the meaning or intent of the input based on the named entities.

For example, a particular user may listen to music by various local bands. A general model may not identify the local band names as being musical artists if the training data upon which the general model was trained did not include the local band names as musical artists. Therefore, input referring to the local bands may not be processed properly by an NLP system using only a general model. However, the particular user may be associated with a personal model that was generated based, at least in part, on data regarding the music that the user typically accesses. When the user submits an utterance containing the words "Play [local band name]," the model preparer 160 can obtain the personal model for the user and the general model, and interpolate the models to generate a model with which the utterance will be processed. The named entity recognizer 162 can then process the words against the model. The name of the local artist submitted by the user, represented in the example by [local band name], may fit the musical artist named entity in the model better than any other named entity, and the named entity recognizer 162 can determine that word represented in the example as [local band name] is a musical artist named entity. If only a general model were used to process the words "Play [local band name]," the named entity recognizer 162 may erroneously determine that the word represented in the by [local band name] is a game named entity, a movie named entity, etc.

The intent classifier 164 may then analyze the named entity sequence and determine that the utterance "Play [local band name]" corresponds to a request by the user to play music by the local band. An application 108—in this case, a music playback application—may then be invoked or provided with data from the NLU module 106. The application 108 can take some action based upon the input, such as beginning playback of music by the local band.

In some embodiments, the NLP system 100 may use a multi-domain NLU engine to determine the meaning or intent of the input. The multi-domain NLU engine can include any number of domain-specific NLU modules configured to operate on text related to a particular subject matter or in a particular domain (e.g., getting directions, shopping, initiating communication with a contact, performing a search, or playing music). Domain-specific NLU modules may process input with respect to a particular domain and produce a result indicating the user's intent. In a multi-domain NLU engine, each of the domain-specific NLU modules can process the input in parallel, with each module producing a separate result indicating the user's intent (e.g., the user wants directions, or the user wants to listen to music). The multi-domain NLU engine or some other module or component of the NLP system can then select a particular domain-specific result on which the NLP system 100 will base its response. One such multi-domain NLU engine is described in U.S. patent application Ser. No. 13/720,909, titled ARCHITECTURE FOR MULTI-DOMAIN UTTERANCE PROCESSING, filed on Dec. 19, 2012 and incorporated herein by reference in its entirety.

An NLP system using a multi-domain NLU engine may incorporate or associate a model preparer 160 with the domain-specific NLU modules. Each domain-specific NLU module can use a different model for named entity recognition, and the particular model that is provided by the model preparer 160 may be generated or selected using the techniques described herein. Advantageously, the multi-domain NLU engine may process an utterance in multiple NLU modules in parallel using different models chosen to optimize or enhance the performance of each domain-specific NLU module. In some embodiments, multiple instances of a single domain-specific NLU module may use different models prepared using the techniques described herein to determine which model provides the best results for a particular user, under particular circumstances, etc. For example, various combinations of base models may be used in parallel (or iteratively) to determine which combinations and weightings to associate with a user.

Named Entity Recognition Process

Figure 2:
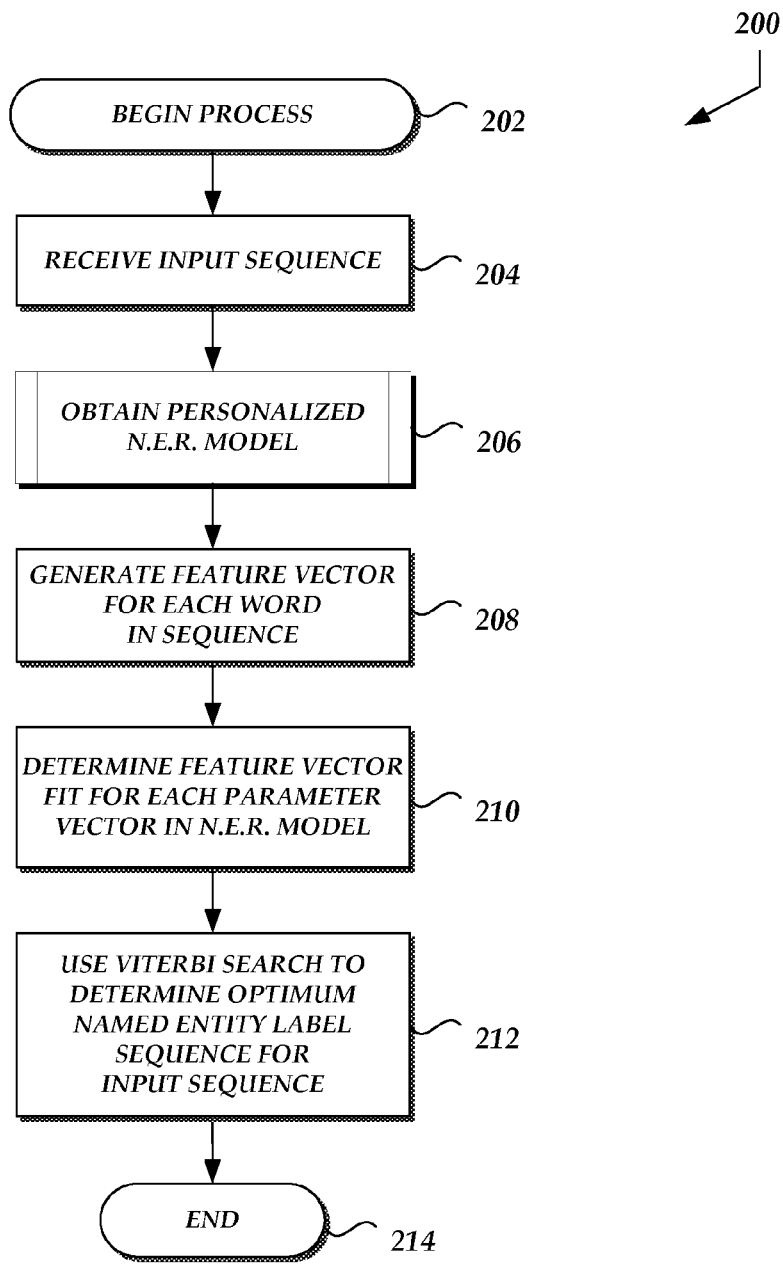
FIG. 2 is a flow diagram of an illustrative process for performing named entity recognition on an input sequence of words.

Turning now to FIG. 2, an illustrative process 200 for performing named entity recognition with personalized models will be described. The process 200 includes obtaining a personalized named entity recognition model for NLU processing. By using such a personalized model, NLU results may be more accurate for input that includes words specific to a user, or words which the user uses differently than the general population.

The process 200 begins at block 202. The process 200 may begin automatically upon initiation of a NLP session. The process 200 may be embodied in a set of executable program instructions stored on a computer-readable medium, such as one or more disk drives, of a computing system of the natural language processing system. When the process 200 is initiated, the executable program instructions can be loaded into memory, such as RAM, and executed by one or more processors of the computing system.

At block 204, the computing device executing the process 200 (e.g., a server on which the NLU module 106 is implemented) may receive an input sequence. The input sequence may be a sequence of words generated by an ASR module 102 from a user utterance, or it may be a sequence of words in a textual content item, etc.

At block 206, the model preparer 160 or some other module or component of the NLP system 100 can obtain a personalized named entity recognition model with which the input sequence will be processed by the named entity recognizer 162. As described in greater detail below, the model preparer 160 can determine which user has submitted or is otherwise associated with the input sequence (e.g., a user making an utterance, an author of a printed publication, etc.). In some embodiments, the model preparer 160 can then obtain a personalized model for the user for interpolation with a general model. In some embodiments, the model preparer 160 can then obtain a group-specific model for a group with which the user is associated. In some embodiments, the model preparer 160 can then obtain and interpolate any number of base models with which the user is associated.

Figure 3:
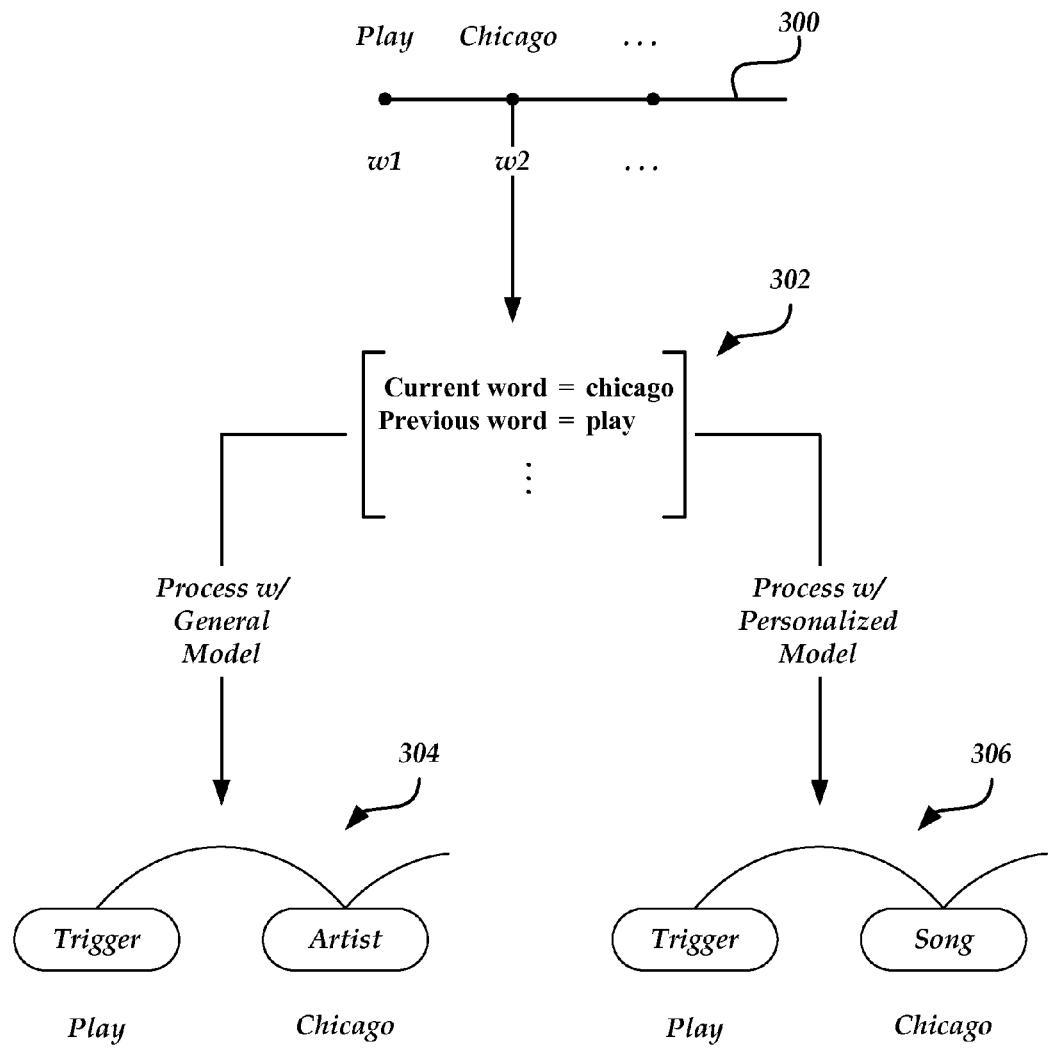
FIG. 3 is a diagram of an illustrative input sequence of words and results that may be obtained from performing named entity recognition on the input sequence with a general model and with a personalized model.

At block 208, the named entity recognizer 162 or some other module or component of the NLP system 100 can then generate processing data, sometimes referred to as a feature vector, for each word of the input sequence. A feature vector can describe various properties and characteristics of a word. FIG. 3 illustrates a partial input sequence 300. The first two words w1 and w2 of the input sequence 300 are "Play" and "Chicago." The named entity recognizer 162 may analyze characteristics of word w2 and the input sequence 300 as a whole to generate a feature vector for word w2.

An example feature vector 302 for word w2 is shown. The feature vector 302 reflects the lowercase value of word w2 and the lowercase value of the word immediately prior to word w2 in the input sequence, in this case word w1. Any number of other values may be included in the feature vector, including the value of the word immediately following word w2, a brief word class for word w2 (e.g., "Aa", where "A" represents any capital letter and "a" represents any number of consecutive lowercase letters), etc. These values may correspond to values in parameter vectors of the named entity recognition model, and therefore may be used to determine which parameter vector of the named entity recognition model indicates a correct or likely named entity for the current word. For example, a feature vector indicating that the current word is "Chicago," and that the word contains a first capital letter followed by any number of lowercase letters, and that the word is preceded in the input sequence by the word "Play" and followed by the word "by," etc. may indicate that the word "Chicago" is a song title rather than an artist name, city name, or movie name.

At block 210, the feature vector can then be used to determine a fit, likelihood, or correspondence with respect to elements of the named entity recognition model, sometimes referred to as parameter vectors. A parameter vector may include data corresponding to data in the feature vector (e.g., lowercase value, brief word class, etc.) and corresponding weights (e.g., likelihoods that feature vectors with particular data indicate that a word corresponds to the named entity associated with the parameter vector). In some embodiments, a feature vector is compared to all or substantially all parameter vectors in a named entity recognition model in order to produce a separate likelihood that the word corresponds to each named entity of the model.

At block 212, the results obtained in block 210 may be processed using a Viterbi algorithm to identify the best sequence of named entities overall rather than a collection of the best individual named entity determinations. Use of the Viterbi algorithms is known in the art and will not be discussed further.

FIG. 3 illustrates sample named entity recognition results 304 and 306. Result 304 may have been obtained through the use of a conventional or general model. The word "Chicago" in the input sequence has been identified as an "artist" named entity based on the general model (e.g., the band Chicago). However, this particular user may have been referring the song "Chicago" by Frank Sinatra, rather than the band "Chicago." A personal model generated based on user data and prior usage may indicate that for this user, use of the word "Chicago" in the music domain (e.g., following the word "play") is more likely to correspond to the song by Frank Sinatra than the band. For example, the user may regularly listen to the song Chicago or to music by Frank Sinatra in general, and the user may rarely or never listen to music by the band Chicago. By interpolating the personal model and general model, the likelihood that the word "Chicago" corresponds to the song in this instance may be increased. The proper result 306 is generated by the named entity recognizer 162 when using the interpolated model provided by the model preparer 160.

Process for Combining General and Personal Models

Figure 4:
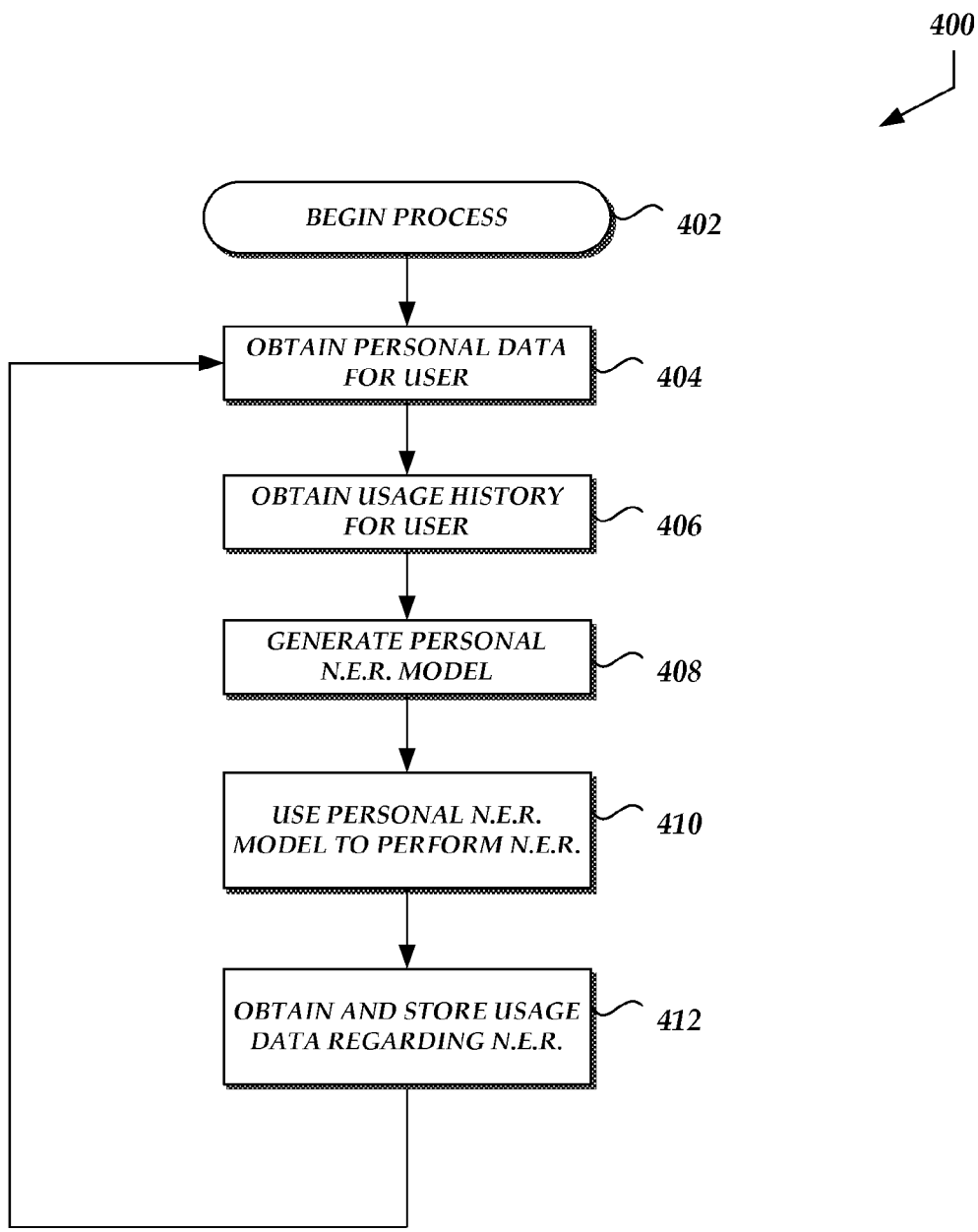
FIG. 4 is a flow diagram of an illustrative process for generating a personal named entity recognition model based on data associated with a user.

FIG. 4 shows an illustrative process 400 for generating a personal CRF model for use in named entity recognition. The process 400 includes obtaining personal user data and prior usage data in order to generate a personal model. Personal models can provide accurate modeling of the way in which individual users or groups of users speak or write, rather than a general user population. Advantageously, the personal model for a particular user may be updated continuously or at predetermined or dynamically determined intervals, such as when additional user data and usage data becomes available. As a result, personal models can respond to changes in the way in which corresponding users speak or write over time.

The process 400 begins at block 402. The process 400 may begin automatically upon first use of the NLP system 100 by a particular user. The process 400 may be embodied in a set of executable program instructions stored on a computer-readable medium, such as one or more disk drives, of a computing system of the natural language processing system. When the process 400 is initiated, the executable program instructions can be loaded into memory, such as RAM, and executed by one or more processors of the computing system.

At block 404, the computing device executing the process 400 (e.g., a server on which the NLU module 106 is implemented) can obtain personal data for a user. The personal data may include contacts, calendar entries, available music files, user characteristics, and the like. Such personal data may be retrieved without any prior use of the NLP system 100 by the user. For example, the model preparer 160 or some other component can obtain portions of personal user data prior to or during processing of the first utterance submitted to the NLP system 100 by the user.

At block 406, the model preparer 160 or some other module or component can obtain usage history for the user, if the user has previously used the NLP system 100. When a user interacts with the NLP system 100, usage data may be stored in the user data store 174. For example, text of the utterances submitted by the user, NLU processing results, user feedback regarding errors, etc. may be stored for a particular user. This data may be helpful in generating or training a personal CRF model for the user because the data reflects actual words used by the user in the actual context in which they were used.

At block 408, the model preparer 160 can train or otherwise generate a personal model for the current user. CRF models trained or generated using personal user data and prior usage data may be more accurate in certain circumstances when compared to general models. For example, a user may subsequently submit an utterance using words in a manner similar to the user's prior use of those same words, which may be different than the way in which the general population uses the same words. A personal model trained on the way the user uses those words can provide more accurate results.

At block 410, the NLP system 100 can use the personal model to perform named entity recognition. As described in detail below, the personal model may be interpolated with a general model to provide broader coverage for cases in which the user submits an utterance using words that the user has not previously used, etc. The use of the personal model at block 410 may occur in parallel with training of the personal model. For example, block 410 may execute on a continuous loop so long as there are utterances to process, while in a parallel, background, or batch process the personal model is modified/updated/trained with usage history generated in block 410 and stored in block 412, below.

At block 412, the NLP system 100 can store usage data regarding use of the personal model to perform named entity recognition. As described above, the usage data may include text input, named entity recognition output, user feedback, and the like. This data can be used in subsequent executions of the process 400 to update or tune the personal model.

The process 400 may return to block 404, where the process 400 may be repeated each time an utterance associated with the user is processed by the NLP system 100, or each N times an utterance or other input associated with the user is processed, etc.

Figure 5:
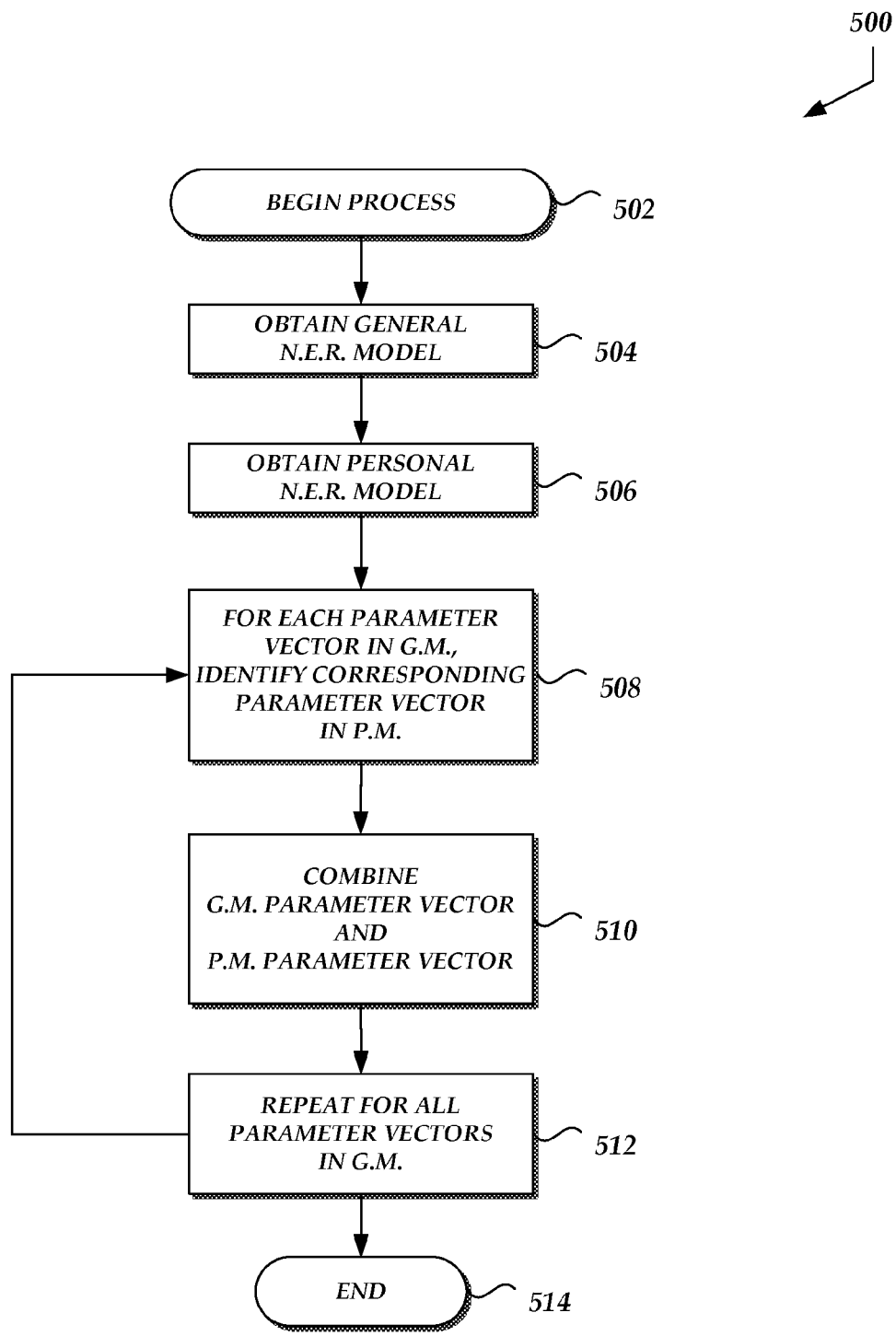
FIG. 5 is a flow diagram of an illustrative process for interpolating a general named entity recognition model and an additional named entity recognition model.

Turning now to FIG. 5, an illustrative process 500 for combining personal models and general models for use in named entity recognition will be described. Advantageously, the process 500 can interpolate a personal model and general model into a single composite model that may be used by existing named entity recognizers without requiring modification to the recognizers; from the perspective of a named entity recognizer, it is merely processing input with a CRF model. Personal models may be combined with general models at run time (e.g., in response to the receipt of input from the user associated with the personal model), or at some previous time (e.g., in an offline batch so that the composite model is ready upon receipt of input from the user).

The process 500 begins at block 502. The process 500 may begin automatically upon receipt of input to be processed by the NLP system 100. The process 500 may be embodied in a set of executable program instructions stored on a computer-readable medium, such as one or more disk drives, of a computing system of the natural language processing system. When the process 500 is initiated, the executable program instructions can be loaded into memory, such as RAM, and executed by one or more processors of the computing system.

At block 504, the model preparer 160 or some other module or component can obtain a general model. For example, the model preparer 160 may retrieve the general model from the general model data store 170.

At block 506, the model preparer 160 or some other module or component can obtain the personal model for the current user. For example, the model preparer 160 may be notified of the identity of the user (e.g., the model preparer 160 may receive an ID number for the user), and can retrieve the personal model associated with the user from the additional models data store 172.

At block 508, the model preparer 160 or some other module or component can begin interpolating the general and personal models by identifying a parameter vector in the general model and a corresponding parameter vector in the personal model. CRF models may include any number of parameter vectors for the various named entities that the models are trained to identify. For example, a general model may include a parameter vector for the "song" named entity. The "song" named entity can indicate which word(s) of an input sequence likely correspond to a song title. The "song" parameter vector includes information that the named entity recognizer 162 uses to identify song title words in input sequences. In some embodiments, a parameter vector for a named entity can include a listing of particular words associated with the named entity, and weights or scores indicating the likelihood that the corresponding word is properly classified as the named entity.

Figure 6:
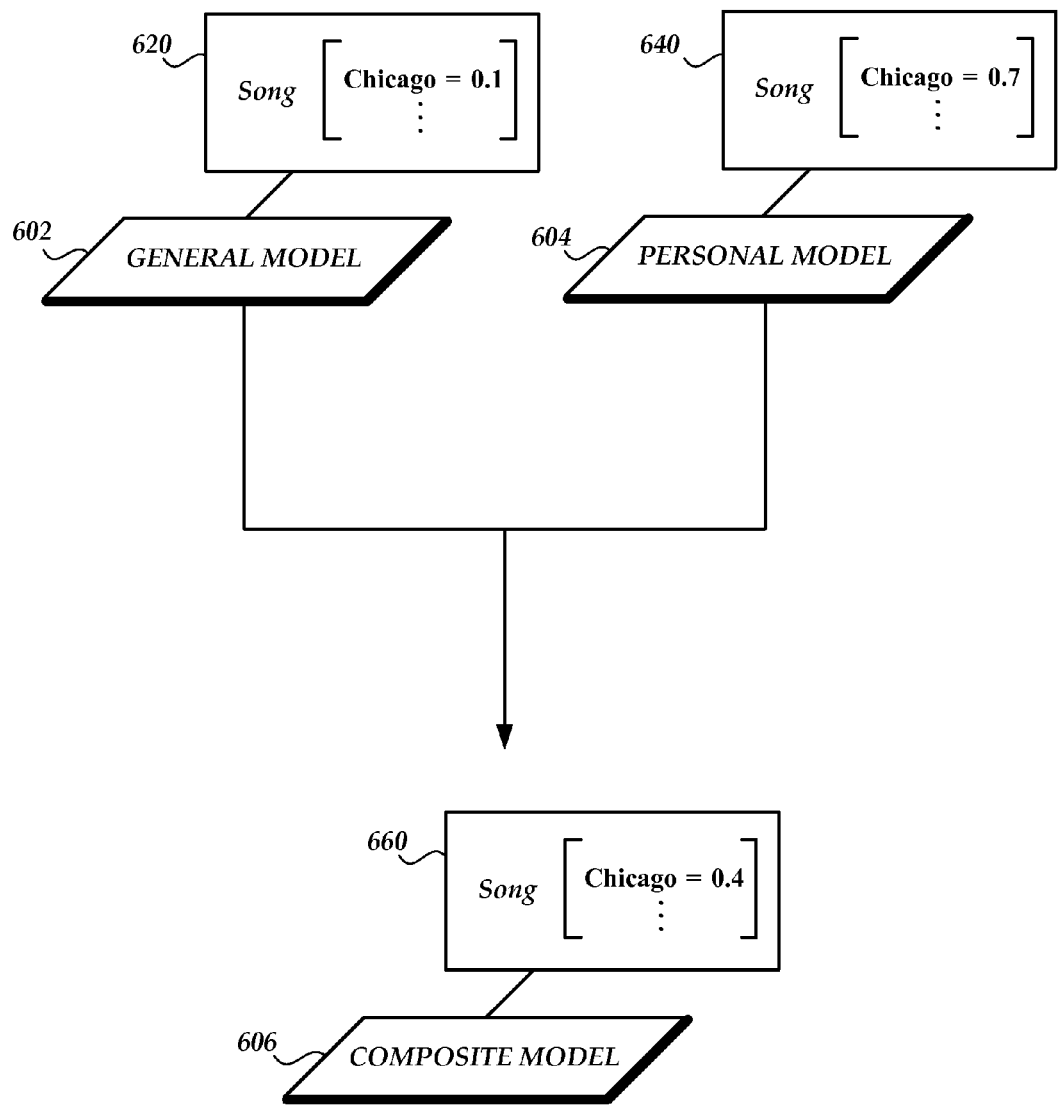
FIG. 6 is a diagram of illustrative named entity recognition models and an interpolated named entity recognition model.

FIG. 6 illustrates an example general model 602 and personal model 604. Each model includes a parameter vector 620, 640 for the "song" named entity. The parameter vector 620 of the general model 602 includes the word "Chicago" with a weight of 0.1. The parameter vector 640 of the personal model 604 includes the word "Chicago" with a weight of 0.7. Input processed by the general model 602 alone may incorrectly classify references to the song Chicago as referring to the band Chicago due to the low weight associated with the word Chicago in the song parameter vector 620. Input processed by the personal model 604 alone may incorrectly classify most or all instances of the word Chicago in user input as referring to the song Chicago, particularly when the amount of data upon which the personal model was trained is small. By interpolating the two models 602, 604 into a composite model, instances of the word Chicago in user input from this particular user may be more likely to be correctly labeled as referring to song Chicago when it is proper to do so, while still providing correct recognition of the word Chicago as referring to the band or city when it is proper to do so.

At block 510 of FIG. 5, the model preparer 160 or some other module or component can combine the parameter vectors from the general model and the personal model to generate a parameter vector for a composite model. Using the example illustrated in FIG. 6, the model preparer 160 may add the weights for "Chicago" from each parameter vector 620, 640 and then divide by two to generate an average weight for "Chicago" as a song. A composite model 606 may be generated, and a parameter vector 660 for "song" may be added. The word "Chicago" may be added to the parameter vector 660 with the average weight 0.4. The same process may be repeated for each element of the parameter vectors 620, 640 (e.g., each word in the "song" parameter vectors 620, 640). In some embodiments, parameter vectors may be combined using techniques other than averaging the data contained therein. For example, a data from a personal model 604 may be weighted more heavily than data from a general model 602, or vice versa. In some embodiments, the relative weighting of each model in the composite model may vary from parameter vector to parameter vector, based on usage of particular parameter vectors by the user, etc.

In some cases, a parameter vector or a particular feature of a parameter vector in the general model 602 may not have a corresponding parameter vector or feature in the personal model 604 (or a parameter vector or a particular feature of a parameter vector of the personal model 604 may not have a corresponding parameter vector or feature in the general model 602). For example, due to the large amount of data on which it is trained, a general model may have more features for particular parameter vectors than are included in those same parameter vectors of a personal model. As another example, due to its personalized nature, a personal model may have particular features that are not present in the corresponding parameter vector of the general model.

In such cases, the parameter vector (or the particular feature of the parameter vector) that is used in the composite model 606 may be taken solely from the model in which it exists. In some embodiments, the parameter vector may be discounted or otherwise modified (e.g., data within the parameter vector may multiplied by a weight that is less than 1) to account for the lack of a corresponding parameter vector in the other model. In some embodiments, additional normalization may be applied due to the lack of a corresponding parameter vector in the other model.

Figure 7:
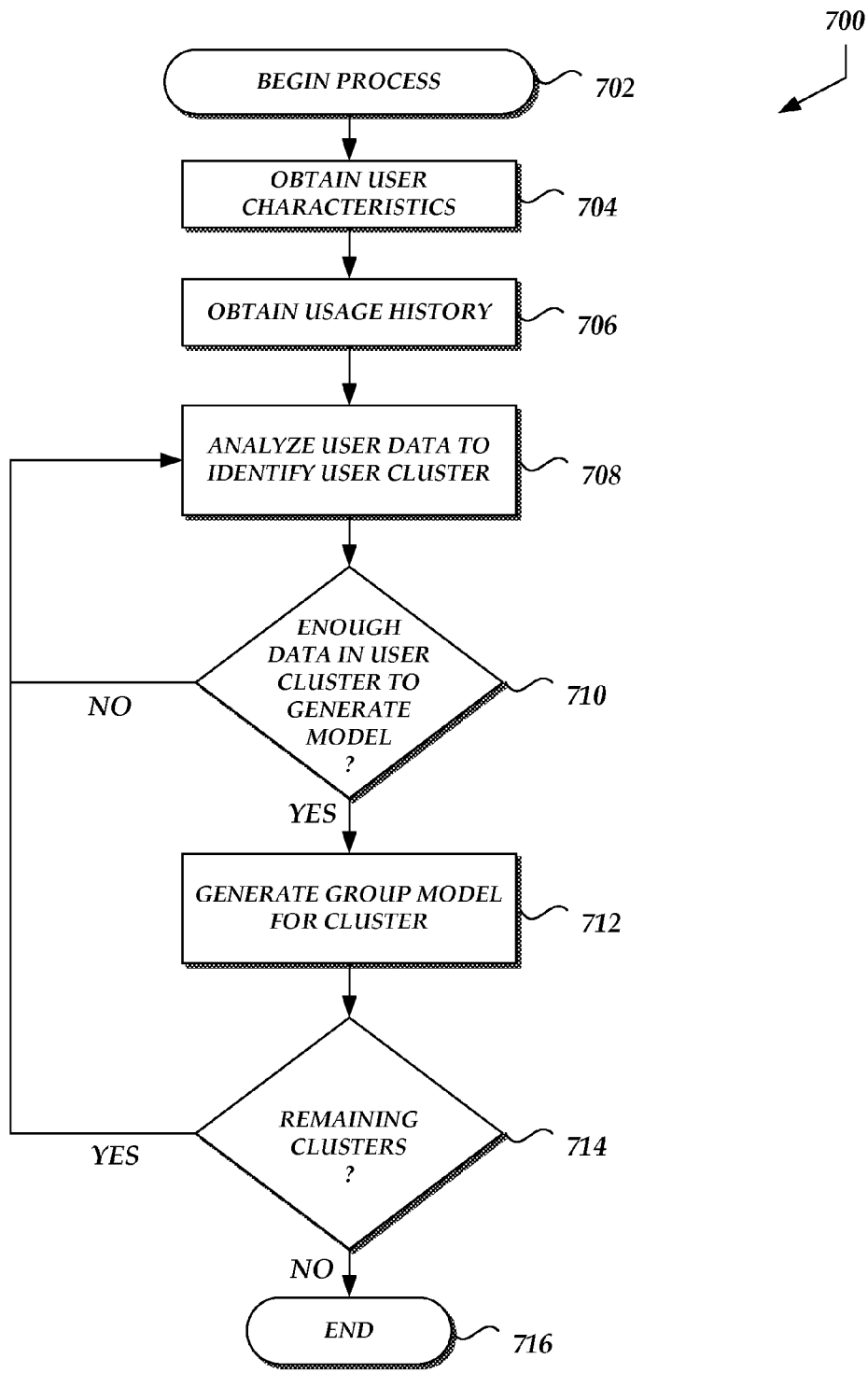
FIG. 7 is a flow diagram of an illustrative process for generating named entity recognition models for groups of users.

At block 512, the process 500 may return to block 508 for each remaining parameter vector until the composite model 606 has been completed and is ready for use in named entity recognition. The composite model may then be provided to the named entity recognizer 162, and the process 500 may terminate. In some embodiments, the weights in the composite model may be normalized (or re-normalized) because modifications were made to the weights during the interpolation process Process for Generating Group Models FIG. 7 shows an illustrative process 700 for analyzing data associated with multiple users in order to generate group-specific models for groups of users. The process 700 includes obtaining a user characteristics and/or usage history for the multiple users, and using automated statistical analyses or other techniques to identify clusters of users who share some meaningful or statistically significant characteristic or usage pattern. Advantageously, group-specific models may then be generated for each cluster or group of users based upon data associated with the users, providing named entity recognition models that are both more adapted to usage characterizes of the users in the group, and also more general than user-specific personal models.

The process 700 begins at block 702. The process 700 may begin automatically or in response to some user or administrator initiation. The process 700 may be embodied in a set of executable program instructions stored on a computer-readable medium, such as one or more disk drives, of a computing system of the natural language processing system. When the process 700 is initiated, the executable program instructions can be loaded into memory, such as RAM, and executed by one or more processors of the computing system.

At block 704, the computing device executing the process 700 (e.g., a server on which the model preparer 160 or the NLU module 106 in general is implemented) can obtain data regarding user characteristics for multiple users. The user characteristic data can reflect age, gender, geographic location, occupation, and other characteristics that may be correlated with various speech patterns and language usage. In some embodiments, data regarding user devices may also be obtained. The device data can reflect form factor, input/output capabilities, processor speed, network bandwidth, and other device characteristics that may be correlated with various NLP system usage patterns.

At block 706, the model preparer 160 or some other module or component can obtain data regarding the NLP system usage history of the multiple users, such as previous inputs, processed named entity sequences, and the like, as described above. The usage history can reflect NLP system usage patterns among groups of users. Speech patterns, language usage, and NLP system usage patterns can provide input for group-specific models that achieve greater accuracy for the particular group than a general model provides.

Figure 8:
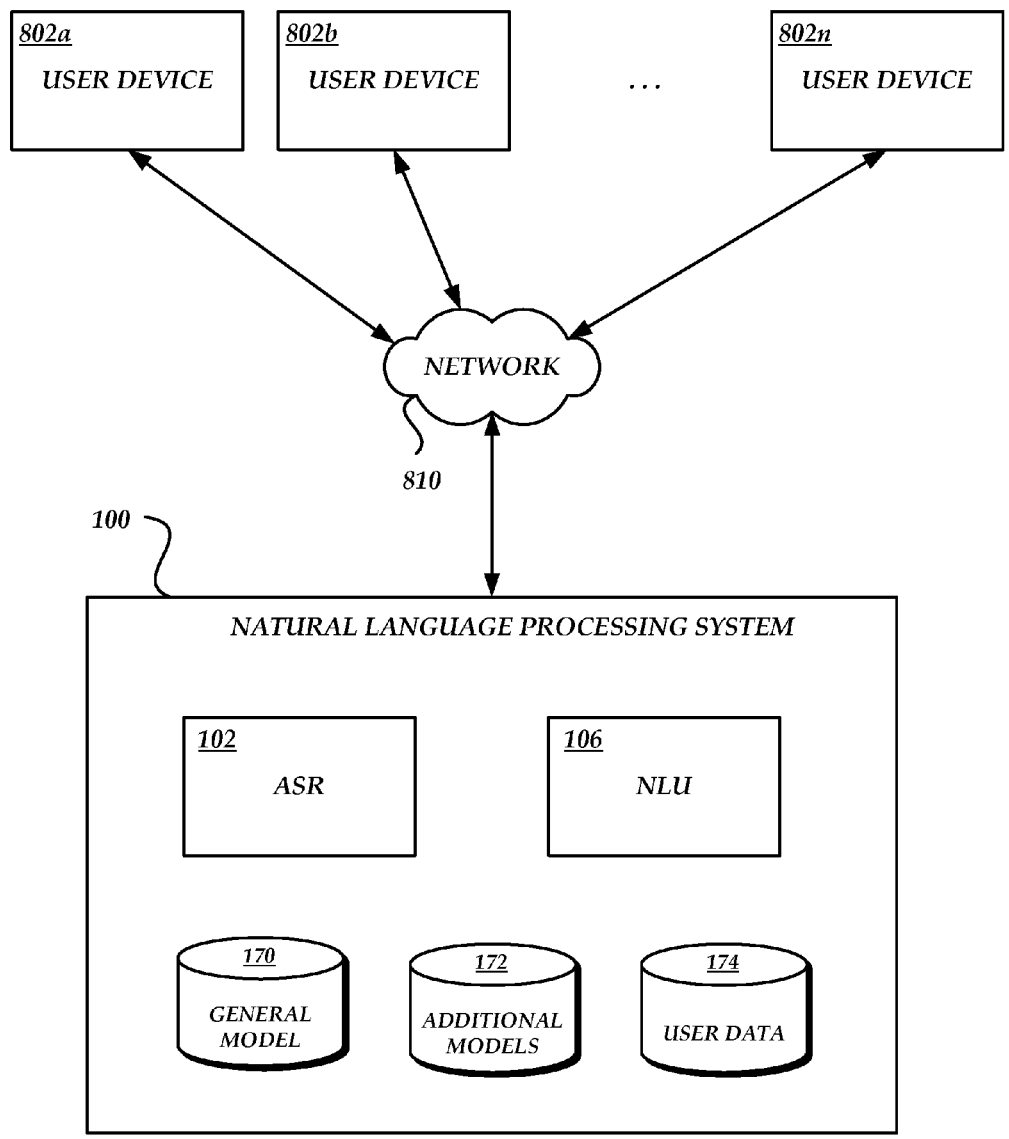
FIG. 8 is a diagram of an illustrative natural language processing system in communication with multiple user devices via a communication network.

FIG. 8 illustrates an NLP system 100 in communication with multiple user devices 802a-802n via a communication network 810. User characteristic data, NLP system usage data, and the like may be collected by the NLP system 100 from the user devices 802a-802n.

The user devices 802a-802n can correspond to a wide variety of electronic devices. In some embodiments, the user devices 802a-802n may be mobile devices that include one or more processors and a memory which may contain software applications executed by the processors. The user devices 802a-802n may include speakers or other audio output components for presenting or facilitating presentation of audio content. In addition, the user devices 802a-802n may contain microphones or other audio input component for accepting speech input on which to perform speech recognition. Illustratively, the user devices 802a-802n may be a mobile phones, personal digital assistants ("PDAs"), mobile gaming devices, media players, electronic book readers, tablet computers, laptop computers, and the like. In some embodiments, the user devices 802a-802n may not be mobile devices, but rather may be desktop computers, set-top boxes, media players, digital video recorders ("DVRs"), gaming consoles, network-connected televisions configured with software and hardware to execute computer applications (e.g., "Smart TVs"), and the like. The software of the user devices 802a-802n may include components for establishing communications over wireless communication networks or directly with other computing devices.

The NLU system 100 can be any computing system that is configured to communicate via a communication network 810. For example, the NLP system 100 may include any number of server computing devices, desktop computing devices, mainframe computers, and the like. In some embodiments, the NLP system 100 can include several devices physically or logically grouped together, such as an application server computing device configured to perform automatic speech recognition and natural language understanding on an utterance, and a database server computing device configured to store records and models. In multi-device implementations, the various devices of the NLP system 100 may communicate via an internal communication network, such as a corporate or university network configured as a local area network ("LAN") or a wide area network ("WAN"). In some cases, the devices of the NLP system 100 may communicate over an external network, such as the Internet, or a combination of internal and external networks.

In some embodiments, the features and services provided by the NLP system 100 may be implemented as web services consumable via a communication network 810. In further embodiments, the NLP system 100 is provided by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The network 810 may be a publicly accessible network of linked networks, possibly operated by various distinct parties, such as the Internet. In other embodiments, the network 810 may include a private network, personal area network ("PAN"), LAN, WAN, cable network, satellite network, etc. or some combination thereof, each with access to and/or from the Internet. For example, the devices of the NLP system 100 may be located within a single data center, and may communicate via a private network. The user devices 802a-802n may communicate with NLP system 100 via the Internet. The user devices 802a-802n may have access to the Internet via a wired or WiFi connection, or via a cellular telephone network (e.g., a Long Term Evolution or LTE network).

In operation, the user devices 802a-802n may transmit user utterances or textual data to the NLP system 100 via the network 810. Each user device 802a-802n may be associated with a particular user, and data regarding the user may be stored on the user device 802a-802n or in the user data store 174. For example, each user may be associated with an account at the NLP system 100, or the NLP system 100 may otherwise determine information about the users based on user interactions with the user device s802a-802n and/or the NLP system 100. The NLP system 100 may also obtain information about the capabilities and specifications of the user devices 802a-802n, such as by analyzing headers and other information exchanged during network communications. Such information may also be stored in the user data store 174, such as when a particular device is associated with a particular user or serves as a proxy for a particular user.

Returning to FIG. 7, at block 708 the model preparer 160 or some other module or component can analyze the user characteristic data, device characteristic data, and/or usage data to identify one or more user clusters or groups. For example, users with similar user characteristics may be preliminarily grouped together. Subsequently, the usage history of such users may be analyzed to group users into smaller or otherwise more meaningful groups. A goal of such clustering/grouping is to find a set of groups that, in sum, represent substantially all users of the NLP system.

At decision block 710, the model preparer 160 or some other module or component can determine whether there is enough data associated with a particular user cluster or group to generate a group-specific model. As described above, CRF models can require a large amount of data to train. Personalized CRF models may be generated with less data than general models. However, the coverage of the personalized CRF models is not as broad as that provided by the general models. The model preparer 160 may look for a threshold amount of data associated with a particular group of users in order to generate a group CRF model with broad enough coverage to be used instead of a general model. If there is enough data, the process 700 may proceed to block 712. Otherwise, the process can return to block 708 where a different cluster is identified.

At block 712, the model preparer 160 or some other module or component can train or generate a model for a particular user group once it is determined that there is enough data to generate a sufficiently complete group model. The group model may be stored in the additional model data store 172 or some other data store. Users may be associated with the model by storing records in the additional model data store 172, user data store 174, or some other data store.

At decision block 714, the model preparer 160 or some other module or component can determine whether there are remaining user clusters for which group-specific models may be generated. If so, the process 700 can return to block 708. Otherwise, the process 700 may terminate at block 716.

Process for Selecting Base Models for a User

Base models may be created to provide improved accuracy in certain circumstances, as compared to general model for an entire population. For example, a base model may be created for each age group of a set of age groups (e.g., one for teenagers, one for college-aged adults, one for senior citizens, etc.). As another example, a base model may be created for each of several geographic regions, occupations, and the like. In some embodiments, the base models are not necessarily associated with a particular characteristic or category of users. Instead, the base models may be trained on distinct data sets of language usage. The data sets may be chosen or identified using automated machine-based processes to optimize the accuracy and coverage of each base model for a particular type or set of language usage examples.

Whereas in the group models described above a particular user is associated with a single group and a model is generated for that group, there may be any number of base models and a particular user may be associated with several of them at any given time. In some embodiments, a user may be associated with two or more models to varying degrees (e.g., the base models may be weighted differently when they are interpolated into a composite model for the user).

Figure 9:
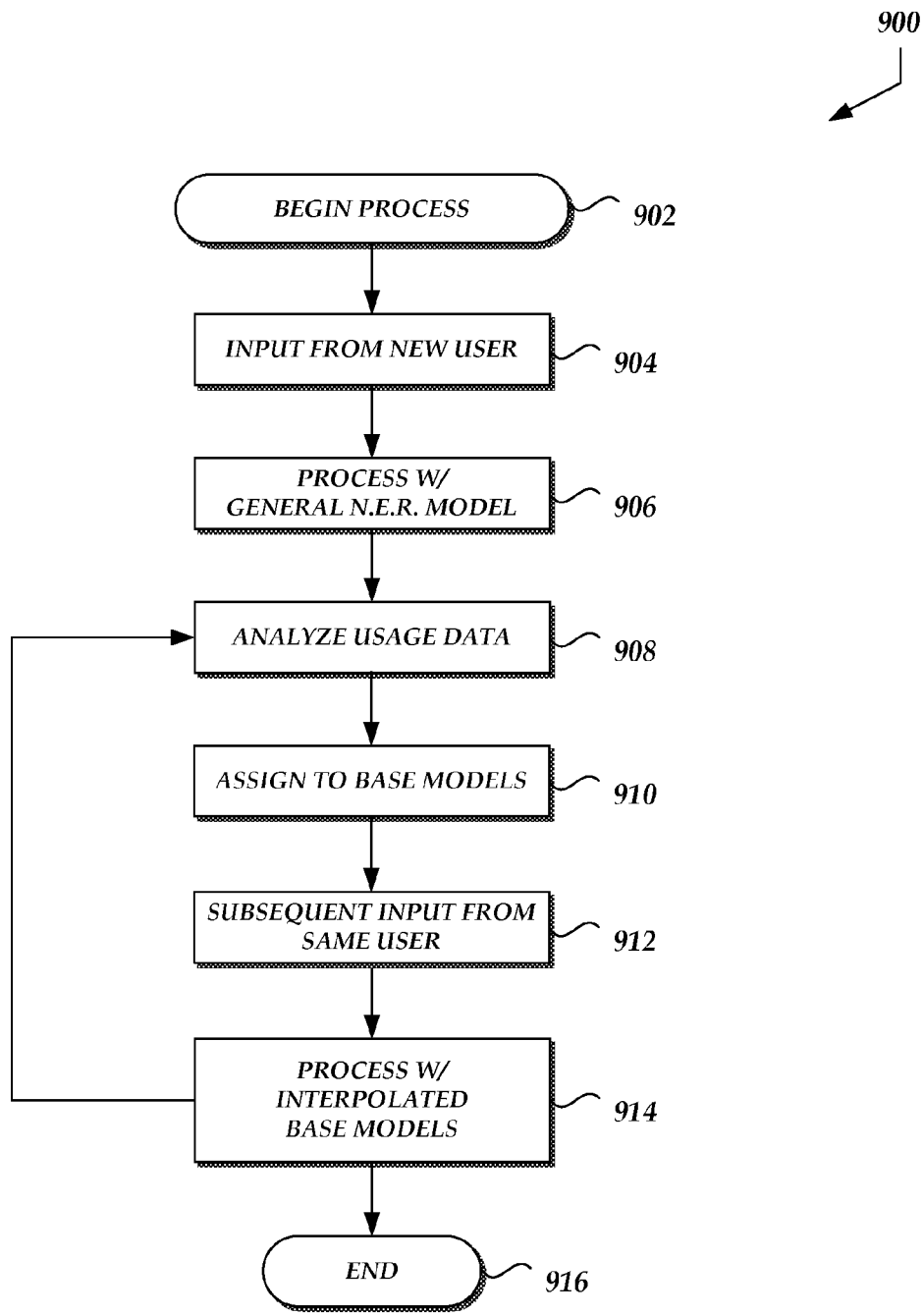
FIG. 9 is a flow diagram of an illustrative process for assigning a user to a combination of named entity recognition models.

FIG. 9 shows an illustrative process 900 for determining which base models to use when processing input data from a particular user. Advantageously, user data and prior usage data may be analyzed to identify those base models that will provide the most accurate named entity recognition results for the user, and optionally to weight the identified models independently for the user. The identified base models may then be interpolated into a single composite model for the user.

The process 900 begins at block 902. The process 900 may begin automatically upon receipt of input from a user. The process 900 may be embodied in a set of executable program instructions stored on a computer-readable medium, such as one or more disk drives, of a computing system of the natural language processing system. When the process 900 is initiated, the executable program instructions can be loaded into memory, such as RAM, and executed by one or more processors of the computing system.

At block 904, the computing device executing the process 900 (e.g., a server on which the model preparer 160 or the NLU module 106 in general is implemented) can obtain input from a particular user for the first time.

At block 906, the model preparer 160 or some other module or component can provide a general model to the named entity recognizer 162 for use in performing named entity recognition on the input data. The general model may be selected because the user has not previously used the NLP system 100, or because the NLP system 100 does not have enough data about the user to properly select base models. The named entity recognizer 162 can then process the input using the general model. In some embodiments, rather than using a general model in such cases, the model preparer 160 may interpolate all of the base models, or some subset thereof, to generate a neutral or general model with which to process the current input.

At block 908, the model preparer 160 or some other module or component can analyze usage data generated during the named entity recognition process and subsequent NLU processes. For example, the model preparer 160 can analyze input data, output data, feedback from the user, and the like to identify vocabulary, language usage patterns, and other relevant characteristics for the current user. The model preparer 160 can also obtain user characteristic data, if it now has access to such data. For example, the user characteristic data can reflect the user's age, gender, geographic location, occupation, and other characteristics that may be correlated with various speech patterns and language usage. In some embodiments, data regarding the user's device may also be obtained. The device data can reflect form factor, input/output capabilities, processor speed, network bandwidth, and other device characteristics that may be correlated with various NLP system usage patterns.

At block 910, the model preparer 160 can associate the user with one or more base models based on the usage and characteristic data analysis of block 908. Each base model may be targeted at a particular characteristic or set of characteristics regarding users, devices, vocabulary, language usage patterns, or other relevant characteristics. The model preparer 160 can select one or more base models targeted at the primary characteristics of the user, while excluding base models targeted at characteristics not associated with user.

In some embodiments, the model preparer 160 can also select models targeted at secondary characteristics of the user (e.g., those characteristics that are not considered to be substantial factors in processing input from the user, but which are still non-trivial). Weights may be computed for each base model. For example, a base model chosen for the user because it is targeted at a primary characteristic of the user (e.g., frequent use of highly technical scientific terminology) can be given a high weight, while a base model chosen for the user based on a secondary characteristic of the user (e.g., that the user occasionally refers to songs by Frank Sinatra, or that the user occasionally refers to local bands of New York City) may be given a lower weight.

Figure 10:
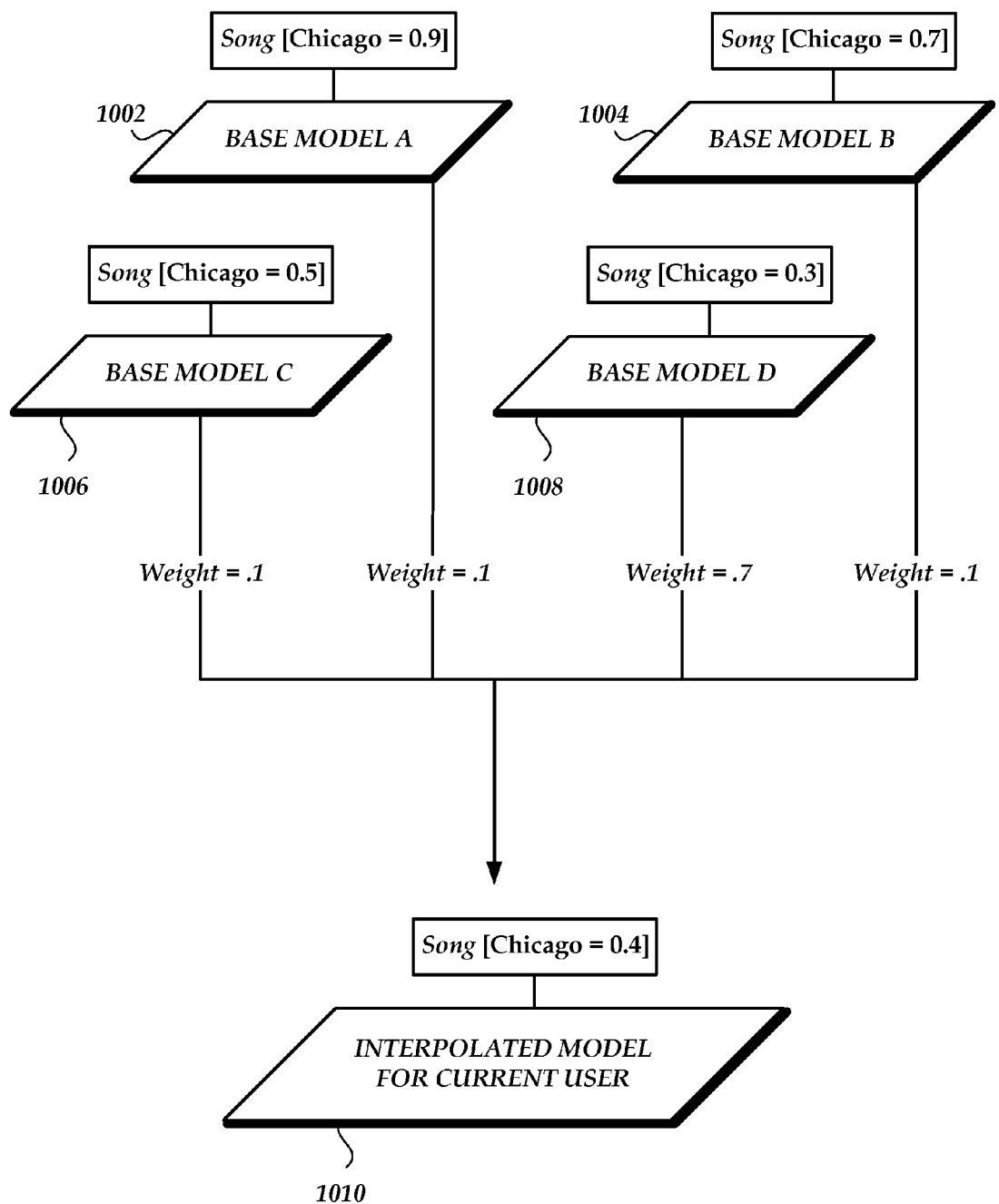
FIG. 10 is a diagram of illustrative named entity recognition models and an interpolated named entity recognition model.

FIG. 10 shows four example base models 1002, 1004, 1006, and 1008 that have been associated with a user. Base model D 1008 may be the primary base model for the current user (e.g., the base model targeted at input with highly technical scientific terminology). Illustratively, the model preparer 160 can assign a weight of 0.7 (on a scale of 0.0 to 1.0) to base model D 1008 for the current user. Base model A 1002 may be a secondary base model for the user (e.g., the base model targeted at Frank Sinatra songs). Illustratively, the model preparer 160 can assign a weight of 0.1 to base model A 1002 for the current user. In similar fashion, base models B 1004 and C 1006 may be secondary base models for the user (e.g., targeted at input referring to local New York City bands, etc), and may also be assigned relatively low weights.

At block 912, the NLP system may subsequently receive input from the same user.

At block 914, input can be processed using interpolated base models for the user to provide a higher degree of accuracy than a general model. The model preparer 160 can load data (e.g., from the user data store 174) reflecting which base models have been assigned to the user, and any weights that have been computed for those base models. The model preparer can then interpolate the base models to generate a composite model for the current user (e.g., using the process described above with respect to FIG. 5).

Returning to FIG. 10, interpolation of multiple base models into a composite model for a particular user is shown. Base model A 1002 has a parameter vector for "song" that includes "Chicago" with a likelihood score of 0.9. Base model B 1004 has a parameter vector for "song" that includes "Chicago" with a likelihood score of 0.7. Base model C 1006 has a parameter vector for "song" that includes "Chicago" with a likelihood score of 0.5. Base model D 1008 has a parameter vector for "song" that includes "Chicago" with a likelihood score of 0.3. Using the weights associated with each base model, the likelihood scores for Chicago can be combined into a single score for the composite model 1010, as shown in FIG. 10. Illustratively, the score for Chicago as a song in base model A 1002 may be multiplied by the weight for base model A 1002, the score for base model B 1004 may be multiplied by the weight for base model B 1004, the score for base model C 1006 may be multiplied by the weight for base model C 1006, and the score for base model D 1008 may be multiplied by the weight for base model D. The weighted scores may then be summed to get the score for Chicago as a song in the composite model 1010.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
   a computer-readable memory storing executable instructions; and
   one or more processors in communication with the computer-readable memory, wherein the one or more processors are programmed by the executable instructions to at least:
      obtain usage data regarding prior usage, by a user, of a natural language processing system;
      train, based at least partly on the usage data, a personal model for use in named entity recognition, the personal model comprising a conditional random field model;
      interpolate the personal model and a general model to obtain a composite model, the general model comprising a conditional random field model, wherein interpolation of the personal model and the general model comprises interpolation of an element of the personal model with a corresponding element of the general model;
      receive audio data regarding an utterance of the user;
      generate a transcription of the utterance using automatic speech recognition;
      process, based at least partly on the composite model, the transcription with a named entity recognition module to determine at least one named entity from the transcription; and
      generate a response based at least partly on the at least one named entity.

2. The system of claim 1, wherein the element of the personal model comprises a first parameter vector, the corresponding element of the general model comprises a second parameter vector, and interpolation of the element of the personal model with the corresponding element of the general model comprises performing a weighted average of the first parameter vector and the second parameter vector.

3. The system of claim 1, wherein the one or more processors are further programmed by the executable instructions to:
obtain user data regarding one or more characteristics associated with the user, wherein training the personal model is further based at least partly on the user data.

4. A computer-implemented method comprising:
under control of one or more computing devices configured with specific computer-executable instructions,
training, based at least partly on user data regarding a user, a personal model for use in named entity recognition, the personal model comprising a named entity recognition model;
interpolating the personal model and a general model to obtain a composite model, the general model comprising a named entity recognition model;
receiving audio input of an utterance, the audio input captured via a microphone;
generating a transcription of the utterance based at least partly on the audio input and
performing named entity recognition on the transcription using the composite model to generate a sequence of named entities.

5. The computer-implemented method of claim 4, wherein the personal model comprises one of: a conditional random field model or a maximum entropy Markov model.

6. The computer-implemented method of claim 4, wherein interpolation of the personal model and the general model comprises interpolation of an element of the personal model with a corresponding element of the general model.

7. The computer-implemented method of claim 6, wherein the element of the personal model comprises a parameter vector.

8. The computer-implemented method of claim 4, wherein the interpolating further comprises interpolating the personal model and the general model and one or more additional models to obtain the composite model.

9. The computer-implemented method of claim 8, wherein interpolating the personal model and the general model and the one or more additional models is based at least partly on a weight associated with each additional model.

10. The computer-implemented method of claim 8, further comprising:
selecting a first model to include in the one or more additional models based at least partly on the user data.

11. The computer-implemented method of claim 4, wherein the user data comprises at least one of: data regarding a personal characteristic of the user, data regarding a device characteristic of a computing device associated with the user, or data regarding prior natural language processing initiated by the user.

12. The computer-implemented method of claim 4, wherein the user data comprises one of: geographic location, age, gender, occupation, or a personal interest.

13. The computer-implemented method of claim 4, further comprising:
receiving, from a user device associated with the user, audio data regarding an utterance of the user; and
performing automatic speech recognition on the utterance to generate a transcription.

14. One or more non-transitory computer readable media comprising executable code that, when executed, cause one or more computing devices to perform a process comprising:
training, based at least partly on user data regarding a user, a personal model for use in named entity recognition, the personal model comprising a named entity recognition model;
interpolating the personal model and a general model to obtain a composite model, the general model comprising a named entity recognition model;
receiving audio input of an utterance, the audio input captured via a microphone;
generating a transcription of the utterance based at least partly on the audio input and
performing named entity recognition on the transcription using the composite model to generate a sequence of named entities.

15. The one or more non-transitory computer readable media of claim 14, wherein the personal model comprises one of: a conditional random field model or a maximum entropy Markov model.

16. The one or more non-transitory computer readable media of claim 14, wherein interpolation of the personal model and the general model comprises interpolation of an element of the personal model with a corresponding element of the general model.

17. The one or more non-transitory computer readable media of claim 16, wherein the element of the personal model comprises a parameter vector.

18. The one or more non-transitory computer readable media of claim 14, wherein the interpolating further comprises interpolating the personal model and the general model and one or more additional models to obtain the composite model.

19. The one or more non-transitory computer readable media of claim 18, further comprising:
selecting a first model to include in the one or more additional models based at least partly on the user data.

20. The one or more non-transitory computer readable media of claim 14, wherein the user data comprises at least one of: data regarding a personal characteristic of the user, data regarding a device characteristic of a computing device associated with the user, or data regarding prior natural language processing initiated by the user.

21. The one or more non-transitory computer readable media of claim 14, wherein the user data comprises one of: geographic location, age, gender, occupation, or a personal interest.

22. The one or more non-transitory computer readable media of claim 14, the further comprising:
receiving, from a user device associated with the user, audio data regarding an utterance of the user; and
performing automatic speech recognition on the utterance to generate a transcription.

23. The one or more non-transitory computer readable media of claim 14, the process further comprising:
generating an interpretation of the transcription based at least partly on the sequence of named entities.

24. The computer-implemented method of claim 4, wherein interpolating the personal model and the general model comprises summing a first likelihood score from a parameter vector of the personal model and a second likelihood score from a corresponding parameter vector of the general model, wherein the parameter vector of the personal model comprises parameters for recognizing a named entity, and wherein the corresponding parameter vector of the general model also comprises parameters for recognizing the named entity.

25. The one or more non-transitory computer readable media of claim 14, wherein interpolating the personal model and the general model comprises summing a first likelihood score from a parameter vector of the personal model and a second likelihood score from a corresponding parameter vector of the general model, wherein the parameter vector of the personal model comprises parameters for recognizing a named entity, and wherein the corresponding parameter vector of the general model also comprises parameters for recognizing the named entity.

* * * * *

UNITED STATES PATENT AND TRADEMARK OFFICE
CERTIFICATE OF CORRECTION

| | |
|---|---|
| PATENT NO. | : 9,190,055 B1 |
| APPLICATION NO. | : 13/828759 |
| DATED | : November 17, 2015 |
| INVENTOR(S) | : Imre Attila Kiss et al. |

It is certified that error appears in the above-identified patent and that said Letters Patent is hereby corrected as shown below:

In the claims

In column 17 at line 20, In Claim 4, after "input" insert --;--.

In column 18 at line 7, In Claim 14, after "input" insert --;--.

Signed and Sealed this
Seventh Day of June, 2016

Michelle K. Lee
*Director of the United States Patent and Trademark Office*